L. GOULD.
Planing Machines.

No. 138,244. Patented April 29, 1873.

Attest:
B. H. Rogers
Thos. H. Dodge

Inventor:
Lyman Gould

UNITED STATES PATENT OFFICE.

LYMAN GOULD, OF NORWICH, CONNECTICUT.

IMPROVEMENT IN PLANING-MACHINES.

Specification forming part of Letters Patent No. 138,244, dated April 29, 1873; application filed February 8, 1873.

*To all whom it may concern:*

Be it known that I, LYMAN GOULD, of Norwich, in the county of New London and State of Connecticut, have made certain new and useful Improvements in Planing-Machines; and I do hereby declare that the following is a full, clear, and exact description of the same, reference being had to the accompanying drawing which forms a part of this specification, and in which—

Figure 1:
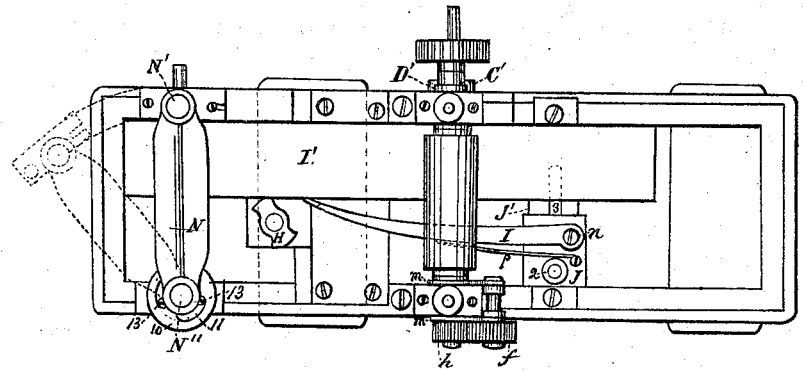
Figures 2, 4, 5:
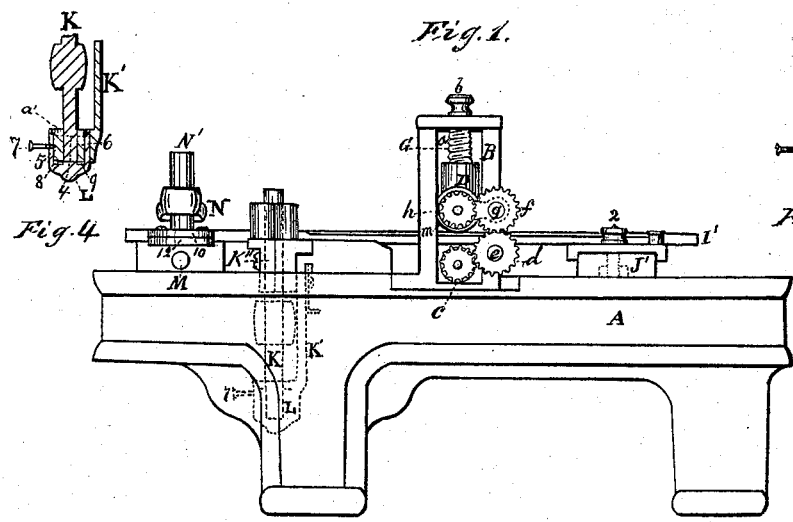
Figure 3:
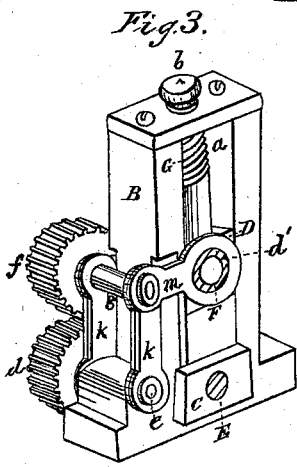

Figure 1 represents a plan view of so much of a planing and matching machine as is necessary to illustrate my present invention. Fig. 2 represents a side view of the parts shown in Fig. 1. Fig. 3 represents, upon an enlarged scale, a perspective view of a detached part of the machine; and Fig. 4 represents a vertical central section of the lower ends of the matcher-head shaft and its frame and bearing; and Fig. 5 represents a side view of the lower ends of the matcher-head shaft and its frame.

To enable those skilled in the art to which my invention belongs to make and use the same, I will proceed to describe it in detail.

The nature of my said invention relates, first, to certain improvements in the devices employed for permitting the upper rear feed-roll to rise and fall without being disconnected from the driving gear or mechanism; second, to certain improvements in the devices employed for supporting the lower end of the upright shaft to which the matcher-head is attached.

In the drawing, the part marked A is the frame of the machine, upon which are fastened the frames B B, in which the bearings or boxes C D C' D' of the journals E F of the rear feed-rolls are fitted. The bearings or boxes D D' of the upper feed-roll are fitted to work up and down in slots $a$ $a$ in frames B B, and are held down by screws G, which are to be combined with yielding springs in any well-known manner. Screws G have thumb or other shaped heads $b$, by means of which they can be turned up or down, as occasion may require, to adjust the roll. To give the upper feed-roll of a planing and matching machine the capacity or freedom to rise and fall, to conform to the inequality of the board, and yet remain in proper connection with the driving-gearing, without undue wearing and straining of the parts, has elicited much study and invention, and many plans have been heretofore devised to this end, and it has been my object, as one feature of my invention, to produce such a construction and combination of parts as would obviate in many respects the objections to the plans adopted or tried prior to my invention. Upon one end of the journal of the lower feed-roll is secured a gear, $c$, which takes into gear $d$, which turns on the end of a stationary journal, $e$, while gear $d$ meshes into gear $f$, which turns on a stud, $g$, and gear $f$ turns gear $h$ fast on the end of the journal of the upper feed-roll D. Upon the ends of the stationary stud $e$ are arranged two straps or links, $k$ $k$, through the upper ends of which are passed the stud $g$. Two other straps or links, $m$ $m$, are also slipped or clasped about the ends of stud or journal $g$, their forward ends being clasped about or slipped upon the hubs $d'$ on the ends of the box or bearing of the journal of the upper feed-roll D. The joints of the links or straps $k$ $k$ and $m$ $m$ are loose enough to allow the straps or links to swing upon their bearings without undue friction. With this construction of the parts it will be seen that, as the upper feed-roll rises and falls to conform to the inequalities of the board, the front ends of the straps or links $m$ $m$ will be elevated or depressed, as the case may be, while the straps or links $k$ $k$ will also swing upon the stud $e$, thereby preventing all binding of the parts, and yet retaining the gears in proper mesh. As the studs or journals $e$ and $g$ are stationary, or do not revolve with their gears $d$ and $f$, there is but little, if any, perceptible wearing of the straps or links. Then, again, the same is true of the forward bearings of the links $m$ $m$, since they are fitted upon the hubs of the boxes of the journal of the feed-roll, which only has a slight up-and-down motion.

Those skilled in the art to which my invention belongs cannot fail to perceive the advantages of this part of my invention. They will also observe that as the straps or links $m$ are arranged upon both ends of the hubs of the upper feed-roll to which the gearing is applied the box is kept from being twisted, and consequently all undue binding of the box in its frame is prevented, thus rendering its up-and-down motion very easy and comparatively free from friction.

To prevent the edge of the board from being split or slivered up by the action of the matching-cutter, represented at H, a long pressure-arm, I, is arranged to turn on a journal or pivot, $n$, while a long flat or other formed spring, $p$, presses its forward end up against the edge of the board I'. 2 is a thumb-screw, by means of which the sliding piece J, to which arm and spring are secured, can be moved nearer to or further from the edge of the board or otherwise adjusted for narrow or wide boards. Piece J is fitted to slide back and forth on the cross-piece J', which is provided with a slot, 3, through which the thumb-screw 2 passes, a clamping-nut being fitted to the lower end of the screw, but prevented from turning when the screw is turned in consequence of its being fitted in a long recess in the lower side of the piece J'. It will be seen that the device is quite simple, not liable to be clogged or get out of order, while at the same time it can be adjusted with safety while the machine is in operation.

The vertical matcher-head spindle or shaft K is supported at its upper end by a sliding frame, K', having a bearing, K'', and these parts may be made in any of the well-known modes of manufacture, but the lower end of the spindle or shaft K is supported in a novel manner. The lower end of frame K' in this instance is made with a socket bearing-piece, L, which is chambered out to receive the lower end of the shaft K, which rests upon a projection, 4, which rises from the center of the bottom of the part L. The projection 4 may be made separately of steel or other suitable material and inserted in any proper manner, and which material is removed after the Babbitt metal has been run in. The bearing-piece 5, taken in connection with the part 6 of the piece L, forms a complete box or bearing for the lower end of shaft K, while the part 5 is held in place by a screw, 7. A small projection, 8, on the lower end of the box-piece 5 keeps the latter elevated a short distance above the bottom of the chamber in the piece L, and, as the part 6 does not extend below the bottom of the part 5, there is an oil-chamber, 9, left at the bottom of the box or bearing of the shaft K, while the top of piece L extends above said box, thus forming a flange or cup, $a'$, above the box, which prevents the oil from running out as it works up over the top of the box. By simply turning the screw 7 the bearing of the lower end of shaft K can be tightened at pleasure.

It will thus be seen that the construction and arrangement of devices which I have invented for supporting the lower end of the shaft of the matcher-head are well calculated to render the working of said shaft very easy and perfect, since the oil can be applied readily and conveniently, is not liable to waste when the machine is in operation, while the parts can be adjusted quickly to prevent all undue play of the lower end of the shaft.

In first fitting up the bearing but little finishing work is required, since the shaft can be put in place and then Babbitt metal run in between the bearing parts 5 and 6 and the end of the shaft, care being taken to fill the bottom of the chamber with some material to prevent the Babbitt metal descending below the lower end.

The position of the shaft of the lower planing-cylinder is shown at M, and N is the pressure-bar under which the material passes, and by which it is held down to the cutters which plane its under side. It often happens that it becomes necessary to adjust the knives, change them, or make repairs of the knives or the parts which hold them, and which operations are attended with considerable inconvenience and delay, as the pressure-bar has heretofore been combined with the machine.

I make the pressure-bar N and its standards N' N'' so that they can be turned or swung around, as indicated in dotted lines, Fig. 1. This feature, however, is not here claimed, as I contemplate making it the subject of a separate application for Letters Patent.

Having described my improved planing and matching machine, what I claim therein as new and of my invention, and desire to secure by Letters Patent, is—

1. The combination, with the hubs $d'$ of box D and standards supporting it, of the journal of the upper feed-roll and the journals or studs $e$ $g$ of the straps or links $k$ $m$, substantially as and for the purposes set forth.

2. The combination, with the chambered bearing-piece L of the planing and matching machine, of the supporting projection 4 and the bearing parts 5 and 6, substantially as and for the purposes set forth.

LYMAN GOULD.

Witnesses:
B. H. ROGERS,
THOS. H. DODGE